United States Patent

Groeneveld et al.

[11] Patent Number: 5,998,982
[45] Date of Patent: Dec. 7, 1999

[54] SWITCHED-MODE POWER SUPPLY WITH STATE INFORMATION

[75] Inventors: Dirk W. J. Groeneveld; Henricus J. M. De Cocq, both of Eindhoven, Netherlands

[73] Assignee: U.S. Philips Corporation, New York, N.Y.

[21] Appl. No.: 08/959,218

[22] Filed: Oct. 28, 1997

[30] Foreign Application Priority Data

Nov. 4, 1996 [EP] European Pat. Off. ............ 96203064

[51] Int. Cl.⁶ .................................................. G05F 1/575
[52] U.S. Cl. ................................ 323/283; 363/49; 363/95
[58] Field of Search .......................... 323/283; 363/95, 363/97, 49

[56] References Cited

U.S. PATENT DOCUMENTS

| | | | |
|---|---|---|---|
| 4,356,542 | 10/1982 | Bruckner et al. | 363/97 |
| 4,954,767 | 9/1990 | Buisson et al. | 323/283 |
| 5,272,614 | 12/1993 | Brunk et al. | 323/283 |
| 5,528,486 | 6/1996 | Kumar et al. | 363/95 |
| 5,534,766 | 7/1996 | Bonissone et al. | 323/283 |
| 5,594,631 | 1/1997 | Katoozi et al. | 323/283 |
| 5,684,685 | 11/1997 | Komatsu et al. | 363/95 |

*Primary Examiner*—Jeffrey Sterrett
*Attorney, Agent, or Firm*—Steven R. Biren

[57] ABSTRACT

A switched-mode power supply comprises storage means (8) for the storage of state information relating to switching times of switching means of the power supply, which state information corresponds to a load level of the load (3). The power supply further comprises detection means (9) responsive to a change in the load level of the load (3) to supply a selection signal (10) to the storage means (8) for the selection of the appropriate state information.

1 Claim, 2 Drawing Sheets

SWITCHED-MODE POWER SUPPLY WITH STATE INFORMATION

BACKGROUND OF THE INVENTION

1. Field of the Invention

The invention relates to a switched-mode power supply comprising an input terminal for receiving an input voltage; an output terminal for supplying an output voltage to a load; a convertor comprising switching means for converting the input voltage to the output voltage; and a control circuit having a reference terminal for receiving a reference voltage, a control input terminal coupled to the output terminal, and a control output coupled to the switching means.

2. Description of Related Art

Such a switched-mode power supply is known from the general state of the art. In a conventional switched-mode power supply an input voltage on the input terminal is converted to an output voltage on the output terminal, conversion being effected in that the control circuit produces a signal on the control input to control the switching times of the switching means. In a settled state the voltage on the output terminal is equal to the voltage on the reference terminal. In the case of load variations, voltage variations on the input terminal, or voltage variations on the reference terminal it takes some time before the voltage on the output terminal has settled to an adequate extent.

A drawback of conventional switched-mode power supplies is that the time required to allow the voltage on the output terminal to settle is comparatively long.

SUMMARY OF THE INVENTION

It is an object of the invention to provide a power supply having a shorter settling time.

To this end, according to the invention, the switched-mode power supply of the type defined in the opening paragraph is characterized in that the switched-mode power supply further comprises storage means for storing state information relating to the switching pattern of the switching means, which information corresponds to a load level of the load.

A switched-mode power supply in accordance with the invention is further characterized in that the switched-mode power supply further comprises detection means for detecting the load level, which detection means supply a selection signal to the storage means.

The storage means store information relating to the switching times of the switching means. The number of states of the power supply stored in the storage means corresponds to the number of load levels of the load. Upon a change in load level the new load level is detected by detection means. Thus, the state corresponding to the new load level can be read from the storage means in order to adapt the switching times of the switching means. As a consequence, the switching times need not be adapted, or only to a small extent, by a control action of the control circuit, which has the advantage that, as a result of this, the amount of time required for the voltage on the output terminal to settle is comparatively small. For an optimum effect information about any load level that occurs should be stored in the storage means. A frequently occurring situation is that there are two load levels. This is the case, for example, in a combined transmitting and receiving device, in which the switched-mode power supply is loaded to a substantially higher extent during transmitting than during receiving.

BRIEF DESCRIPTION OF DRAWINGS

The invention will be described in more detail with reference to the accompanying drawings, in which.

DETAILED DESCRIPTION OF THE PREFERRED EMBODIMENTS

In these Figures like parts or elements bear the same reference symbols.

Figure 1:
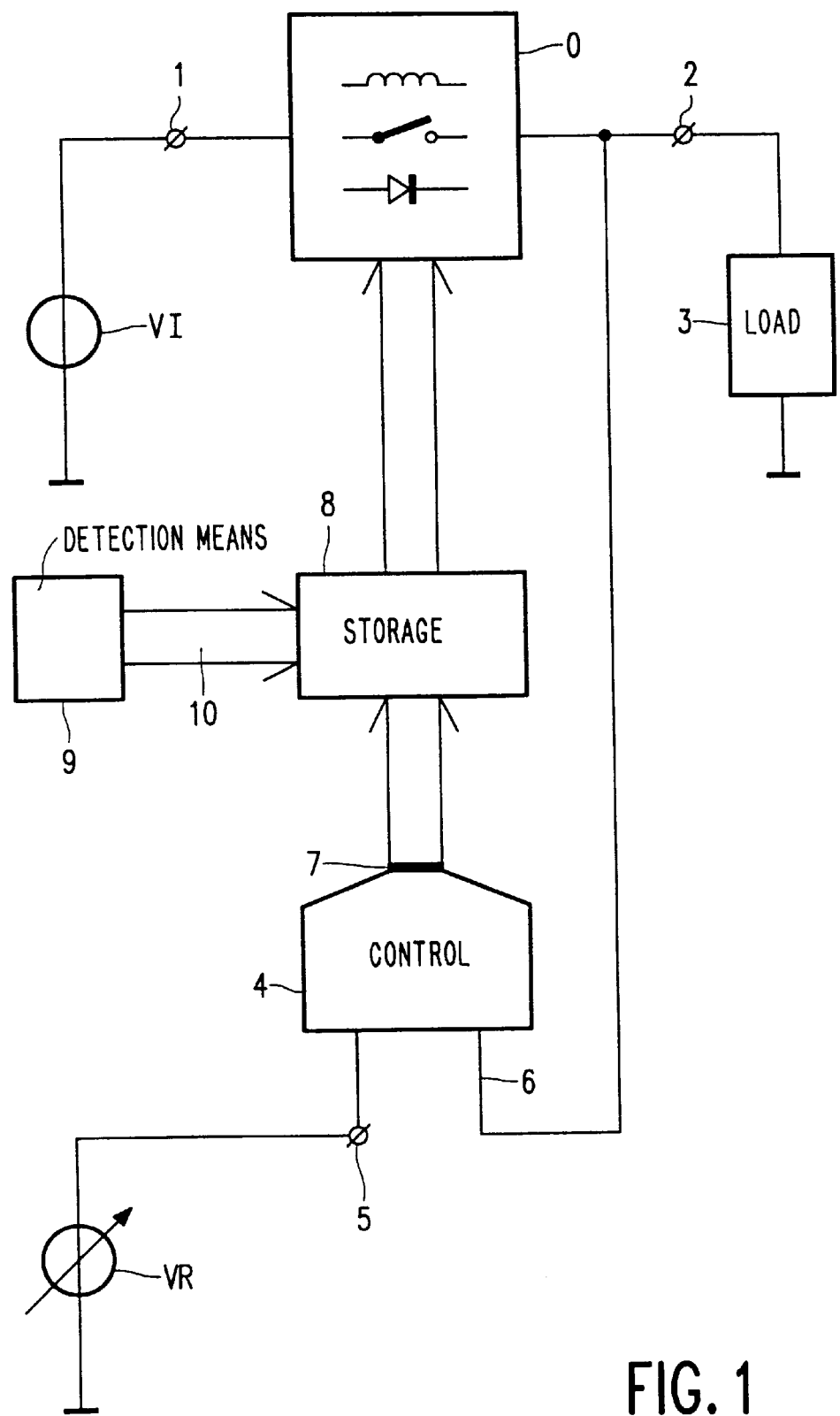
FIG. 1 is a basic circuit diagram of a power supply in accordance with the invention.

FIG. 1 shows a basic circuit diagram of a power supply in accordance with the invention, comprising a convertor 0 having an input terminal 1 coupled to an input voltage VI and having an output terminal 2 coupled to a load 3. The convertor 0 can be implemented with various types of switched convertors such as, for example, the well-known buck convertor, boost convertor and buck-boost convertor. The power supply further comprises a control circuit 4 having a reference terminal 5 coupled to a reference voltage VR. The reference voltage VR gives an adjustable voltage on the reference terminal 5. The control circuit 4 has a control input terminal 6 coupled to the output terminal 2. The control circuit 4 has a control output 7 coupled to the switching means of the convertor 0 through storage means 8. If a load variation of the load 3 occurs, for example when the load 3 is a transmitting and receiving device and this device changes over from receiving to transmitting, thereby causing the load of the switched-mode power supply to increase significantly, detection means 9 supply a selection signal 10 to the storage means 8. As a result, information is read from the storage means 8, which information is used to determine the initial values of the turn-on and turn-off times of the switching means. In the event of a (small) residual error of the voltage on the output terminal 2, this is eliminated via the control circuit 4. After a short settling time the voltage on the output terminal 2 is (substantially) equal to the voltage on the reference terminal 5.

Figure 2:
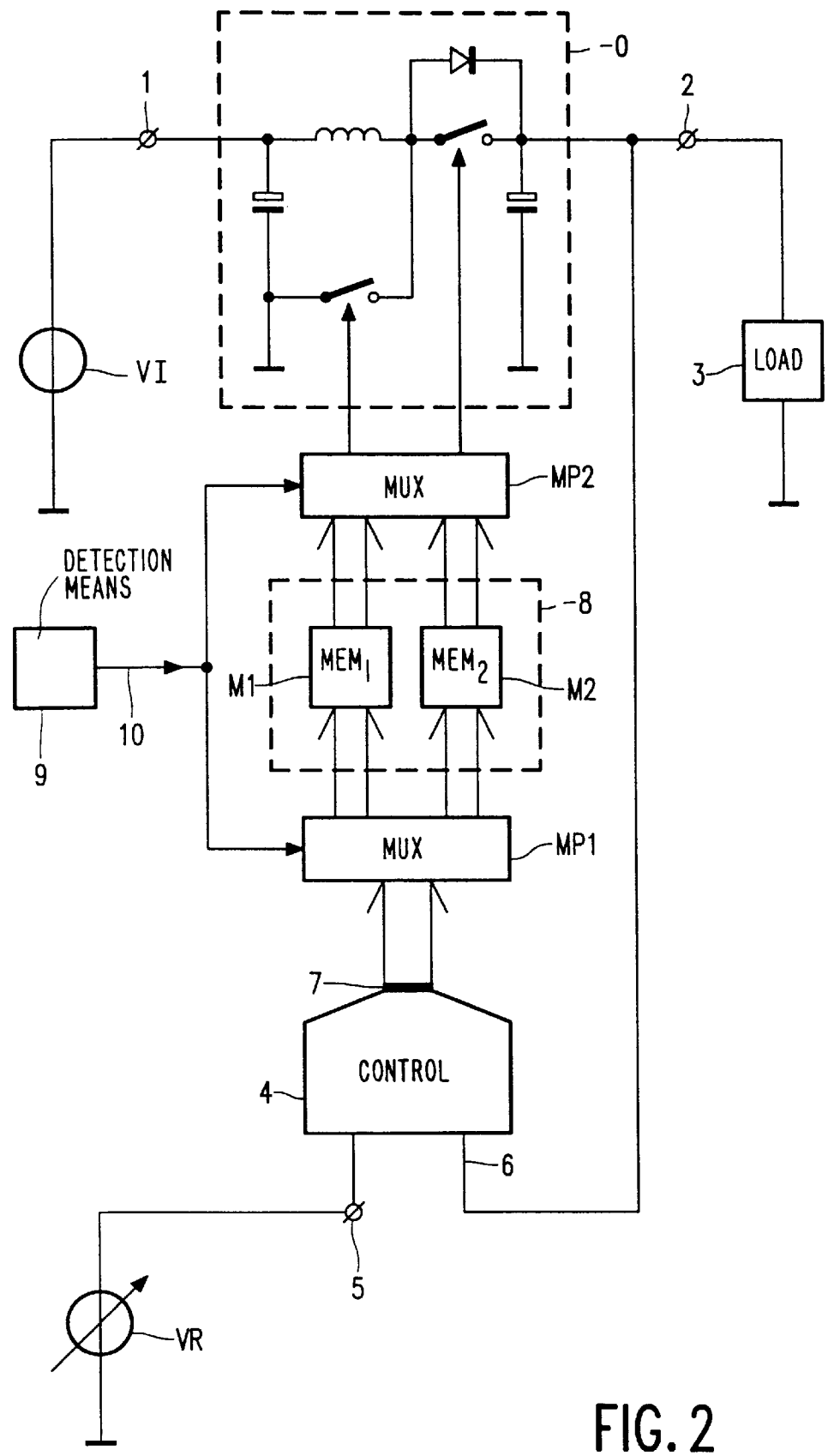
FIG. 2 shows an embodiment of a power supply in accordance with the invention.

FIG. 2 shows an embodiment of a power supply in accordance with the invention, where the number of different load levels of the load 3 is, for example, two. The storage means 8 comprise a first and a second memory section M1, M2. The first memory section M1 stores state information corresponding to the one load level of the load 3 and the second memory section M2 stores state information corresponding to the other load level. The power supply further comprises a first multiplexer MP1 for coupling the control output 7 either to the first memory section M1 or the second memory section M2 under control of the selection signal 10, and a second multiplexer for coupling either the first memory section M1 or the second memory section M2 to the switching means of the convertor 0 under control of the selection signal 10. The multiplexers MP1, MP2 are coupled to the first memory section M1 or the second memory section M2 depending on the load level of the load 3.

The power supply can be constructed as an integrated circuit but it can also be constructed by means of discrete components. Analog techniques as well as digital techniques can be used. For example, for the implementation of the storage means 8 it is possible to use digital memory cells or analog memory cells.

We claim:

1. A switched-mode power supply comprising:

an input terminal for receiving an input voltage;

an output terminal for supplying an output voltage to a load;

a converter comprising switching means for converting the input voltage to the output voltage;

a control circuit having:
   a reference terminal for receiving a reference voltage,
   a control input terminal coupled to the output terminal, and
   a control output coupled to the switching means; and storage means for storing state information relating to the switching pattern of the switching means, which information corresponds to a load level of the load, an output of said storage means being coupled to the switching means of said converter for setting initial values of a turn-on time and a turn-off time of said switching means, wherein the switched-mode power supply further comprises detection means for detecting the load level, which detection means supply a selection signal to the storage means, the load level comprises a discrete number of values, the storage means comprise a first memory section and a second memory section, and the switched-mode power supply further comprises a first multiplexer for coupling the control output either to the first memory section or the second memory section under control of the selection signal, and a second multiplexer for coupling either the first memory section or the second memory section to the switching means of the converter under control of the selection signal.

* * * * *